US007746986B2

(12) United States Patent
Bucchieri et al.

(10) Patent No.: US 7,746,986 B2
(45) Date of Patent: Jun. 29, 2010

(54) METHODS AND SYSTEMS FOR A SIGN LANGUAGE GRAPHICAL INTERPRETER

(75) Inventors: Vittorio G. Bucchieri, Wakefield, MA (US); Albert L. Schmidt, Jr., Hopkinton, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 325 days.

(21) Appl. No.: 11/453,202

(22) Filed: Jun. 15, 2006

(65) Prior Publication Data

US 2007/0291910 A1   Dec. 20, 2007

(51) Int. Cl.
*H04M 11/00* (2006.01)
(52) U.S. Cl. .................. 379/52; 704/243.2; 704/251; 704/271
(58) Field of Classification Search .................. 379/52; 704/243, 2, 251, 271
See application file for complete search history.

(56) References Cited

U.S. PATENT DOCUMENTS

| 5,169,342 | A | | 12/1992 | Steele et al. | |
| 5,917,888 | A | * | 6/1999 | Giuntoli | 379/52 |
| 5,953,693 | A | | 9/1999 | Sakiyama et al. | |
| 5,991,723 | A | | 11/1999 | Duffin | |
| 6,377,925 | B1 | * | 4/2002 | Greene et al. | 704/271 |
| 6,477,239 | B1 | * | 11/2002 | Ohki et al. | 379/52 |
| 2002/0184023 | A1 | * | 12/2002 | Busayapongchai et al. | 704/251 |
| 2004/0034522 | A1 | * | 2/2004 | Liebermann et al. | 704/2 |
| 2006/0080099 | A1 | * | 4/2006 | Thomas et al. | 704/243 |
| 2006/0285652 | A1 | * | 12/2006 | McClelland et al. | 379/52 |
| 2007/0003025 | A1 | * | 1/2007 | Alves et al. | 379/52 |
| 2007/0116190 | A1 | * | 5/2007 | Bangor et al. | 379/52 |

* cited by examiner

*Primary Examiner*—Curtis Kuntz
*Assistant Examiner*—Maria El-Zoobi

(57) ABSTRACT

Systems and methods for displaying visual content to a user corresponding to sound captured at a user terminal are disclosed. After receiving over a network from a user terminal a request to convert sound into a visual content representing the sound, wherein the sound comprises one or more words, a translation server may retrieve text corresponding to the one or more words from a database. The translation server may then convert the text into one or more content phrases, wherein the content phrases represent the meaning of the one or more words, and convert each of the one or more content phrases into a new language. Finally, the translation server may send visual content to the user terminal representing the new language.

17 Claims, 5 Drawing Sheets

METHODS AND SYSTEMS FOR A SIGN LANGUAGE GRAPHICAL INTERPRETER

BACKGROUND INFORMATION

The majority of deaf people born with this condition prefer to read content when it is "signed" rather than written. Conveying "signed" content entails the use of gestures combined with facial expressions. "Signed" content often has to be finger spelled (foreign names, phone numbers, etc.), but for the majority of the cases, it communicates concepts actions and facts. ASL is equivalent to a non-English language (i.e. French, German, etc.) There is little relationship between the word sequence of an English sentence and the correspondent sign language translation. An ASL interpreter would convey the meaning of a sentence in a way that disregards the syntax and grammatical structure of English spoken or written sentences. Sign language uses the upper body (waist up), arms, hands, fingers, head, and facial expressions to describe and emphasize communication the same way spoken words use tone, sound volume, and pauses between words. Sign language interpreters are usually hired to translate in American Sign Language (ASL) either a simultaneous conversation or other English content.

Currently, conveying signed content is also provided by filmed and digitized video. Graphically animated hands or characters are also used. Spelled words and signed meaning of single words or short sentences are also available in interactive dictionaries. Sign language interpreters are also often used to guide, consult, or even be filmed.

These current methods of conveying signed content have many disadvantages. Series of signed phrases cannot be concatenated or built without filming a translator. There is no existing library of motion sign language that would allow an author to effectively structure a signed sentence using available upper body movement and facial expressions of various types and intensity. A specific translation effort has to be made every time new content is generated, whether it is a new web page, television announcement, or conversation. A human sign language interpreter also has to be hired for a meeting between deaf and hearing individuals, spelling out a conversation via teletype equipment (TTY) or in other interactions.

Therefore, there is a need for a system that includes a graphical computer agent that is used to convey content in sign language, where the agent can convey at the same time a presentation of sound or text corresponding to sounds and words from a third party. A graphically depicted agent brings consistency and visual advantages that a live interpreter would not be able to provide.

DETAILED DESCRIPTION OF PREFERRED EMBODIMENTS

Systems and methods for providing a sign language graphical translator (SLGT) may receive sound from a number of sources or third parties. These third parties may be, for example, another person, a television, a telephone, a radio, or any other device capable of transmitting sound. In response, the SLGT may convert the captured sound, which can consist of spoken words or noises, into text as well as translating the content of the words and sentences into ASL. The SLGT may then match the ASL content with animation corresponding to the ASL and then display to the user of the SLGT the text as well as the ASL animation corresponding to the content of the captured sound.

According to one exemplary embodiment, a method may comprise capturing sound from a third party at a user terminal, wherein the sound comprises one or more words, converting the one or more words into text representing the one or more words, converting the one or more words into one or more content phrases, wherein the content phrases represent the meaning of the one or more words, converting each of the one or more content phrases into a new language, and displaying visual content at the user terminal representing the new language.

According to another exemplary embodiment, a system may comprise a translation server connected to a network and accessible by at least one user terminal, and wherein the translation server is configured to receive over a network from a user terminal a request to convert sound into a visual content representing the sound, wherein the sound comprises one or more words, retrieve text corresponding to the one or more words from a database, convert the text into one or more content phrases, wherein the content phrases represent the meaning of the one or more words, convert each of the one or more content phrases into a new language, and send visual content to the user terminal representing content in the new language.

Exemplary embodiments will now be discussed in additional detail with reference to the figures provided herewith. Wherever possible, the same reference numbers are used throughout the accompanying figures to refer to the same or like elements. The figures illustrate the preferred exemplary embodiments and implementations, but the description of those embodiments does not indicate or imply that other embodiments or implementations do not fall within the scope of the present invention. It is to be understood that other implementations may be utilized, and that structural and procedural changes may be made without departing from the scope of the present invention, as set forth in the appended claims.

Figure 1:
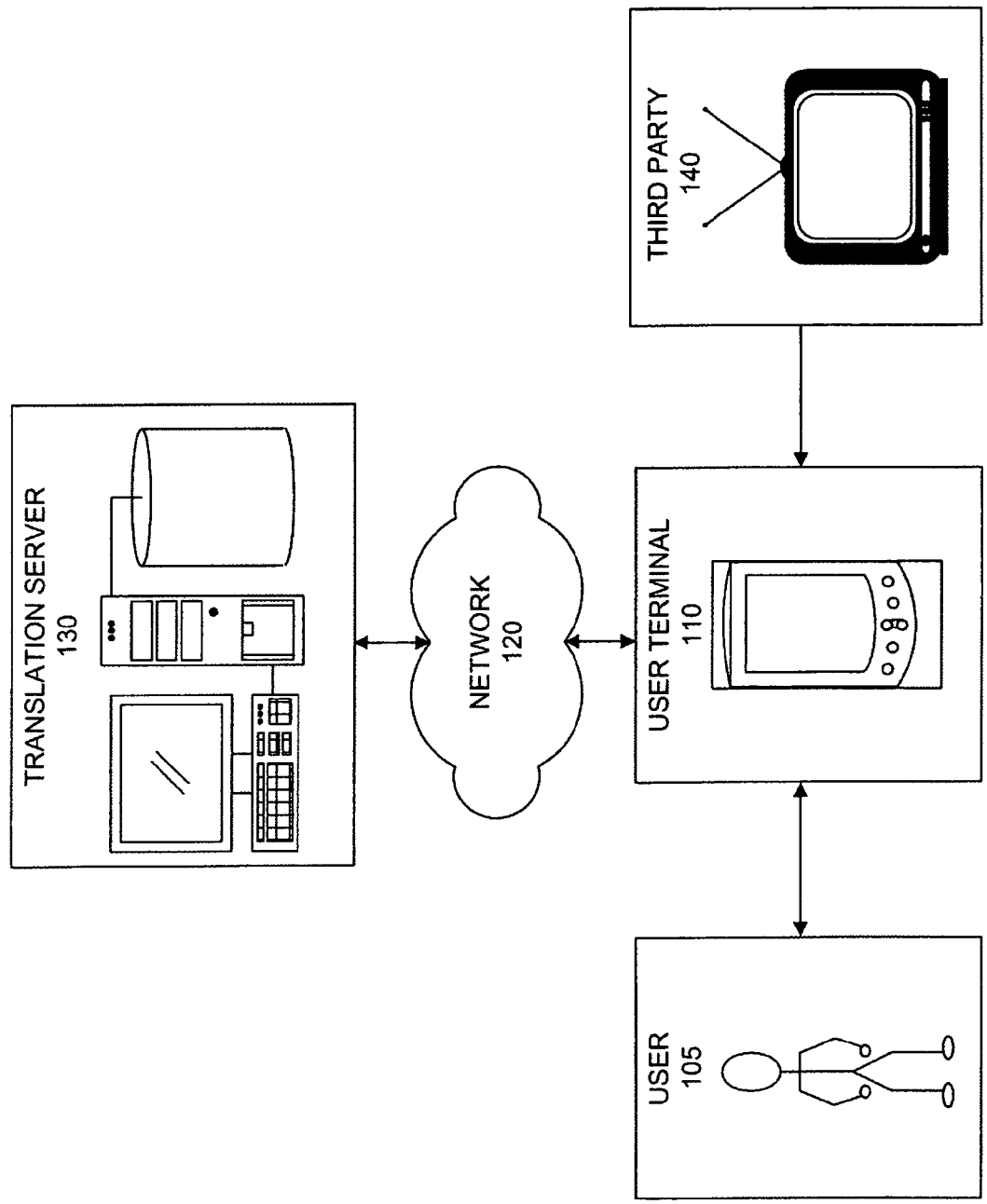
FIG. 1 illustrates a block diagram of an exemplary system environment consistent with certain aspects related to the present invention.

FIG. 1 provides a block diagram exemplifying system environment 100 consistent with one embodiment described herein. System environment 100 may include user 105, user terminal 110, network 120, a translation server 130, and third party 140.

User 105 may be any individual or public, charitable, commercial, or any other entity. User terminal 110 may be one or more data processing systems that perform computer-executed processes for providing user 105 with an interface to network 120. User terminal 110 may be implemented as one or more computer systems, including, for example, a personal computer, minicomputer, microprocessor, workstation, or similar computer platform typically employed in the art. Alternatively, user terminal 110 may be embedded within a specialized computing system, including, for example, a "set-top box" for receiving and displaying television broadcasts, video telephone, mobile telephone, personal digital assistant, or video game device. User terminal 110 may be located in a user's home, at a business, in a public kiosk, or in a portable device.

Network 120 may be one or more networks that communicate information between, at least, user terminal 110 and translation server 130. Network 120 may be any type of network for communicating information, including data, text, pictures, voice, and video. In some instances, network 120 has sufficient bandwidth to present visual content transmitted from translation server 130 to user terminal 110 in real-time. Network 120 may be a shared, public, private, client-server, or peer-to-peer network encompassing a wide or local area, including an extranet, an Intranet, the Internet, a local area network (LAN), wide area network (WAN), public switched telephone network (PSTN), integrated services digital network (ISDN), radio links, terrestrial wireless network, cable television network, satellite television network, and any other form of wired or wireless communication networks. Further, network 120 may be compatible with any type of communication protocol used by the components of the system environment to exchange information, such as Transmission Control/Internet Protocol (TCP/IP), Hypertext Transfer Protocol (HTTP), Secure Hypertext Transfer Protocol (HTTPS), Real-time Transport Protocol (RTP), Real Time Streaming Protocol (RTSP), Global System for Mobile Communication (GSM) and Code Division Multiple Access (CDMA) wireless formats, Wireless Application Protocol (WAP), user datagram protocol (UDP), the file transfer protocol (FTP), high bandwidth wireless protocols (e.g., EV-DO, WCDMA), or peer-to-peer protocol. Network 120 may be provided by one or more service providers, such as an Internet Service Provider (ISP), a wired/wireless telephone service provider, a cable or satellite television provider, an operator of WAN or LAN, or an operator of a point-to-point network.

Translation server 130 may be one or more computer systems, including, for example, a personal computer, minicomputer, microprocessor, workstation, or similar computer platform typically employed in the art. Translation server 130 executes computer-executable instructions for providing translation services to user terminal 110 over network 120, as described further below.

Third party 140 may be an individual, another computer, a television, a telephone, movie theatre, or the like. In some cases, user 105 may receive information from third party 140 using user terminal 110. For instance, third party 140 may be a movie theatre, and user 105 will want to translate whatever information third party 140 is transmitting such as a conversation between characters in the movie.

The general interaction between the elements 105-140 illustrated in FIG. 1 is as follows. Third party 140 may submit sound that consists of words as well as noise, whether it is a movie playing or a radio transmitting sound. User 105 uses user terminal 110 to capture the sound transmitted by third party 140. As third party 140 submits sound, user terminal 110 transmits the captured sound to the translation server 130 through network 120. Translation server 130 may then provide translation services to user terminal 110. Translation server 130 may first translate the captured sound into text and transmit the text corresponding to the captured sound back to user terminal 110. Translation server 130 may also translate the content of the text into ASL. Once translation server 130 has translated the captured sound into text and ASL, then it may transmit the text along with corresponding ASL animation to user terminal 110.

As illustrated in FIG. 1, system environment 100 includes a single user 105, user terminal 110, network 120, translation server 130, and a third party 140. However, as is readily apparent to an artisan, practical embodiments may include a plurality of users, user terminals, servers, and/or third parties linked over multiple networks by a plurality of network exchange points sharing data between the plurality of networks. Translation server 130 may also be included in user terminal 110, eliminating the need of the network 120.

Figure 2:
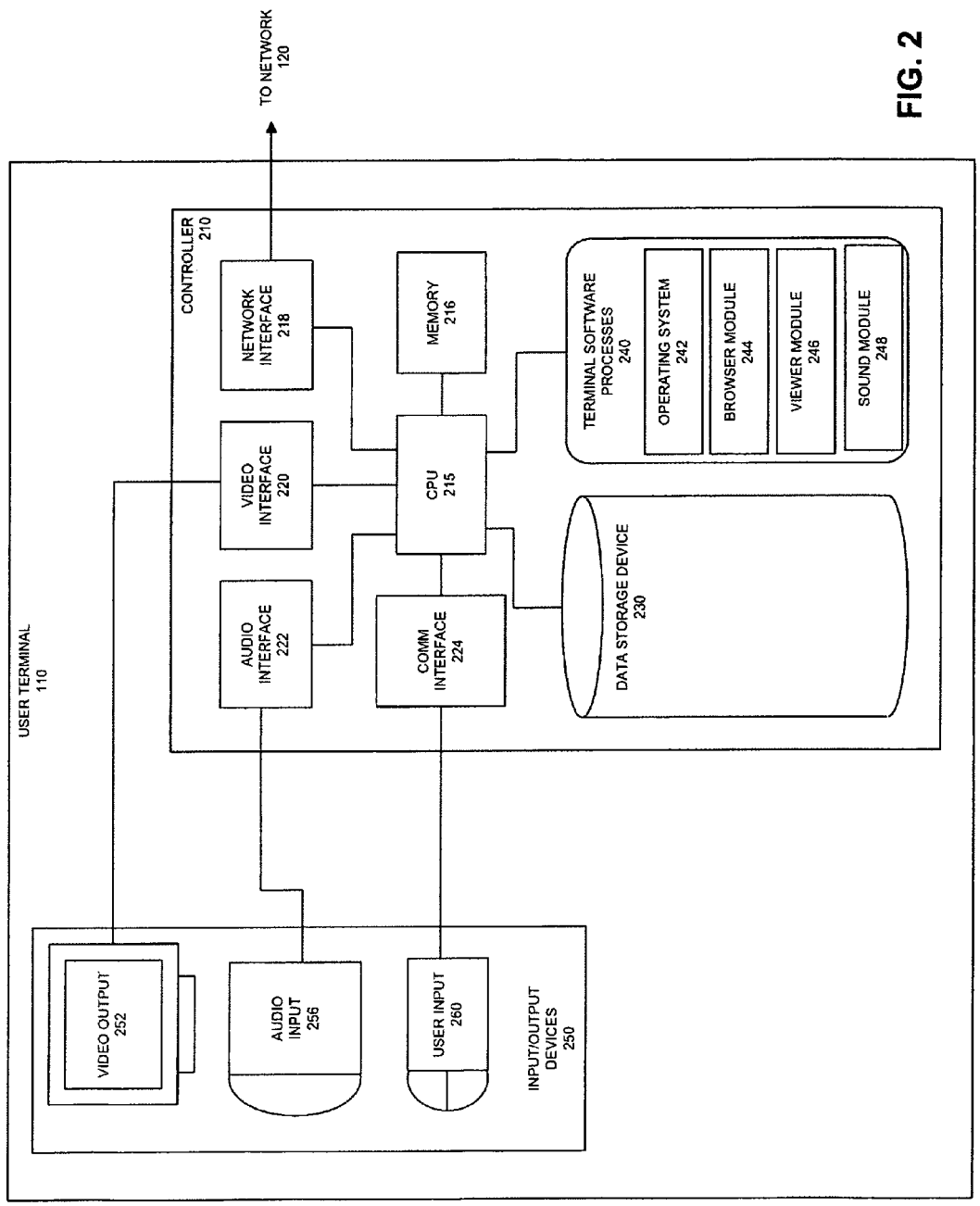
FIG. 2 illustrates a block diagram of an exemplary user terminal consistent with certain aspects related to the present invention.

FIG. 2 provides a block diagram illustrating exemplary user terminal 110 that provides user 105 with an interface to translation server 130 over network 120. User terminal 110 may include controller 210 and input/output devices 250. Controller 210 may be one or more processing devices that execute computer instructions stored in one or more memory devices to provide functions consistent with certain aspects of the preferred embodiments described herein. Controller 210 may include, for example, central processing unit (CPU) 215, memory 216, network interface 218, video interface 220, audio interface 222, communications interface 224, and data storage device 230.

CPU 215 provides control and processing functions for user terminal 110 using executable instructions and data, for example, stored in memory 216 and/or data storage device 230. Although FIG. 2 illustrates a single CPU 215, controller 210 may include multiple CPUs. CPU 215 may also include, for example, a coprocessor, memory, registers, and/or other processing devices and systems as appropriate. CPU 215 may be any conventional processor, such as an off-the-shelf microprocessor (e.g., Intel Pentium); or an application-specific integrated circuit adapted specifically for user terminal 110.

Memory 216 may be one or more memory devices storing data and instructions that, when executed by CPU 215, perform the processes described herein. Memory 216 may include semiconductor and magnetic memories such as random access memory (RAM), read-only memory (ROM), electronically erasable programmable ROM (EEPROM), flash memory, optical disks, magnetic disks, etc. When user terminal 110 executes an application installed in data storage device 230, CPU 215 may download at least a portion of instructions from data storage device 230 into memory 216.

Network interface 218 may be one or more hardware and/or software components configured to translate information sent between CPU 215 and network 120. For example, network interface 218 may be a modem or a local area network (LAN) port. Network interface 218 may support any telecommunications or data network, including, for example, Ethernet, wireless fidelity (WiFi), token ring, asynchronous transfer mode (ATM) or ISDN. Alternatively, network interface 218 may be an external device connected to controller 210 though communications interface 224.

Video interface 220 may be any device for translating information exchanged between CPU 215 and video output device 252. Vector-based Flash™ animations may also be used. Video interface 220 may contain a library of vector-based artwork; which may be animated to display ASL content via video output 252. The ASL Animation Database 346 may also provide animation instructions. For example, similar to a puppet, the physical puppet may reside in the video output 252 and the information and motion that would move the strings may come from the ASL Animation Database 346. Although video interface 220 is described as a hardware device, it may also be implemented software, firmware, or a combination thereof.

Audio interface 222 may be any device for enabling information exchange between CPU 215 and audio input device 256. Furthermore, audio interface 222 may include a CODEC for decompressing audio data stored in a compressed format (e.g., MP3). Although audio interface 222 is described as a hardware device, it may also be implemented completely in software, firmware, or a combination thereof.

Communications interface 224 provides one or more interfaces for exchanging data between controller 210 and external devices, including input/output devices 250. Communications interface 224 may include, for example, a serial port (e.g., RS-232, RS-422, universal serial bus (USB), IEEE-1394), parallel port (e.g., IEEE 1284), or wireless port (e.g., infrared, ultraviolet, or radio-frequency transceiver). In some embodiments, audio, video, and/or network data may be exchanged with CPU 215 through communications interface 224.

Data storage device 230 may provide storage for user terminal 110. Data storage device 230 may be implemented with a variety of components or subsystems, including, for example, a magnetic disk drive, an optical disk drive, flash memory, or other devices capable of permanently storing information. Further, although data storage device 230 is shown within user terminal 110, data storage device 230 may be implemented external to user terminal 110. Data storage device 230 may include program code and data for user terminal 110 to communicate with translation server 130. In addition, data storage device 230 may include program instructions and data for an operating system 242, a browser module 244, a viewer module 246, and a sound module 248.

Exemplary input/output devices 250 include video output 252, audio input 256, and user input 260. Video output 252 may be any device for displaying visual information such as a cathode ray tube (CRT), liquid crystal display (LCD), light emitting diode display (LED), plasma display, or electroluminescent display. Audio input device 256 may be a speaker, headphone, earpiece, or other audio transducer that converts audible tones into electrical signals. User input device 260 may be any conventional device for communicating user 105's commands to user terminal 110, including a keyboard, keypad, computer mouse, touch screen, trackball, stylus, scroll wheel, joystick, television remote controller, or voice recognition controller.

The configuration or relationship of components illustrated in FIG. 2 is exemplary. The components of user terminal 110 may be independent components operatively connected, or they may be combined within a single device, including the functions of some or all of the aforementioned components. For example, input/output devices 250 may be a plurality of independent devices within separate housings detachably connected to a generic controller 210, such as a personal computer or home entertainment system. In other implementations, controller 210 and input/output devices 250 may be integrated within a single housing with a specialized controller 210, such as a portable telephone. One of ordinary skill in the art may select different configurations of components based on the requirements of a particular implementation of user terminal 110, giving consideration to factors including, but not limited to, cost, size, speed, form factor, capacity portability, power consumption, and reliability.

As further illustrated in FIG. 2, user terminal 110 may execute terminal software processes 240. Computer-executable instructions providing software processes 240 may be stored in memory 216 and/or data storage device 230 and include, for example, operating system 242, browser module 244, viewer module 246, and sound module 248.

Operating system 242 may include computer-executable instructions executed by CPU 215 for managing the execution of instructions, memory, data storage, devices, security, and/or network communications. In addition, operating system 242 may provide a user interface enabling user 105 to interact with user terminal 110 via video output 252, audio input 256, and user input 260. For example, the user interface may be a graphics user interface displayed on a computer display through which user 105 interacts by entering information with a computer mouse and keyboard, such as provided in Windows manufactured by Microsoft Corporation. Alternatively, the user interface may be an on-screen menu generated by a set-top box and displayed on a television through which user 105 interacts by entering information using a wireless remote control.

Browser module 244 (another type of user interface) includes computer-executable instructions executed by CPU 215 for enabling user 105 to view and interact with images and documents hosted, for example, by translation server 130 and/or other network servers. For instance, browser module 244 may be a Web browser for rendering web pages (documents accessible on the World Wide Web of the Internet) with content formatted using the hypertext markup language (HTML) or variants thereof. Such pages may also provide a user interface and may be retrieved from storage or web servers using the hypertext transfer protocol (HTTP). In some implementations, browser module 244 may be a third-party browser, such as Internet Explorer by Microsoft Corporation or Safari by Apple Computer, Inc. In other implementations, browser module 244 may be adapted for a particular user terminal 110 and/or network 120, such as a set-top box connected to a cable television network.

Viewer module 246 may include computer-executable instructions processed by CPU 215 for providing an interactive user interface for viewing visual content as well as text through video output 252. Viewer module 246 may provide controls for playing, recording, rewinding, reviewing, cueing, fast-forwarding, and pausing visual content and other forms of media. In some implementations, viewer module 246 may be a third-party media viewer, such as Windows Media Player manufactured by Microsoft Corporation, QuickTime published by Apple Computer, Inc. or Flash by Macromedia. In other implementations, viewer module 246 may be integrated with browser module 244, forming a unified browser and reviewed. In other implementations, these modules may be separate but operate together as requested.

Sound module 248 includes computer-executable instructions executed by controller 210 for receiving and storing sound from user 105 and/or third party 140. For example, user 105 may want to see the actual words and animation corresponding to sound transmitted from third party 140. Sound module 248 may capture the sound from third party 140 through user terminal 110.

The configuration or relationship of software modules 242-248 illustrated in FIG. 2 is exemplary. In accordance with certain aspects of the present invention, terminal software processes 242-248 may be independent applications, or they may be combined within a single application including the functions of some or all of the modules.

Figure 3:
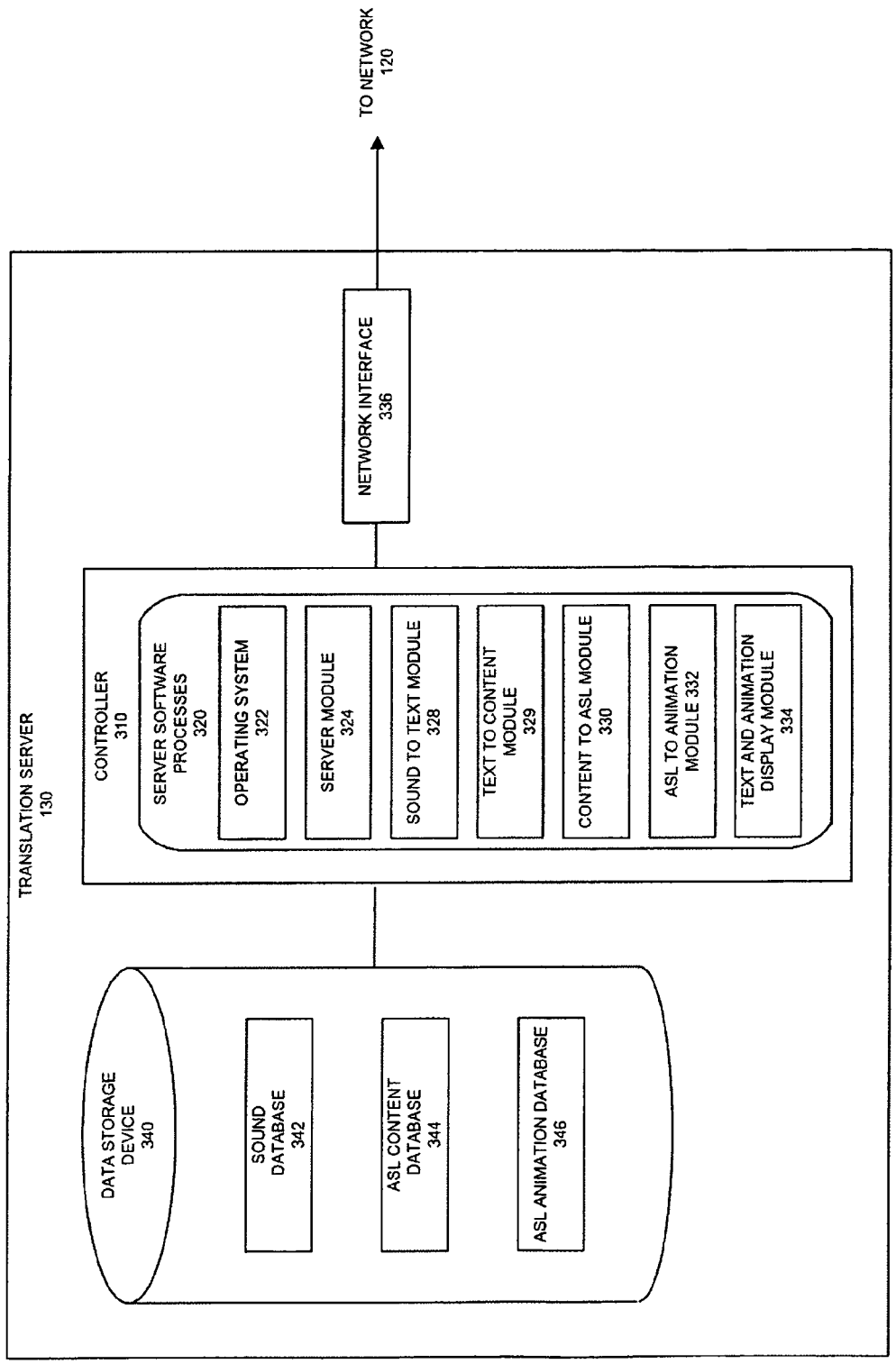
FIG. 3 illustrates a block diagram of an exemplary translation server consistent with certain aspects of data related to the present invention.

FIG. 3 provides a block diagram of an exemplary translation server 130, which may be one or more processing devices that execute software modules stored in one or more computer memory devices. Translation server 130 may comprise a system including a server system that includes controller 310, network interface 336, and data storage device 340.

Controller 310 may be one or more generic computer systems, including, for example, a personal computer, minicomputer, microprocessor, workstation, or similar computer platform typically employed in the art. Controller 310 may be comprised of a CPU and memory for storing and executing data and instructions. CPU may be any conventional controller, such as an off-the-shelf microprocessor (e.g., Intel Pentium) or an application-specific integrated circuit adapted for a specific translation server 130. CPU may process instructions and data stored in computer memory and/or data storage device 340. Memory may be one or more memory devices that store data, and include an operating system and software modules that, when executed by controller 310, perform processes consistent with certain aspects related to the present invention. These memory devices may include semiconductor and magnetic memories, such as RAM, ROM, EEPROM, flash memory, optical disks, magnetic disks, etc. Network interface 336 may support any telecommunications or data network, including, for example, Ethernet, WiFi, token ring, or Fiber Distributed Data Interface. Data storage device 340 may be one or more memory devices to store data and executable instructions used by controller 310.

Data storage device 340 may include sound database 342, ASL content database 344, and ASL animation database 346. Sound database 342 may store records that include information relating to a universal category of sounds, from words, concatenated words, and text to various noises. Sound database 342 may also store corresponding text to each sound, describing the sound. For example, for the sound of a cough, sound database 342 may store "cough" as the corresponding text. In another example, for the word "hello," sound database 342 may store the text "hello" as the corresponding text.

ASL content database 344 may store records that include information describing content phrases and the translated ASL counterpart for that phrase. ASL animation database 346 may store visual content associated with the various content phrases stored in ASL content database 344. For each content phrase, ASL content database 344 may store a corresponding animation representing a person's mouth or lips that show that phrase as if a person were talking and saying the phrase. ASL content database 344 may also store a corresponding animation of a hand signing the ASL phrase by spelling out the English words, as well as an animated character that emphasizes hand, arm, and face movements of ASL content. ASL content database 344 may also store the ASL animation of every letter in the alphabet as well as every number.

For example, the ASL content database 344 will store the ASL animation equivalent of the letter "A," "B," "C," and so on, as well as for each number from "0" to "9." ASL content database 344 may store a graphical ASL animation as well as a lip-read animation for the word "hello." Furthermore, ASL content database 344 may store a single ASL animation for the content phrase "how are you." Each of the foregoing databases is further described further below.

As further illustrated in FIG. 3, controller 310 may execute a plurality of software processes 320 for providing, among other things, a real-time translation service that implements the preferred embodiments described herein. Computer-executable instructions providing software processes 320 may be stored in computer memory and/or data storage device 340, including an operating system 322, server module 324, sound-to-text module 328, content-to-ASL module 330, ASL-to-animation module 332, and text and animation display module 334.

Operating system 322 may include computer-executable instructions executed by controller 310 for managing the execution of instructions, memory, data storage, devices, security, and/or network communications. In addition, operating system 322 may provide a user interface, such as provided in Windows manufactured by Microsoft Corporation.

Server module 324 may include computer-executable instructions executed by controller 310 for receiving and transmitting data traffic over network 120 from user terminal 110 and/or third party 140. For example, server module 324 may be a standard web server that user terminal 110 may access with a browser module 244, such as the Apache web server.

Sound-to-text module 328 may include computer-executable instructions executed by controller 310 for converting the captured sound into text, consistent with embodiments of the present invention. Sound-to-text module 328 functions to generate text corresponding to the sound captured by user terminal 110. Sound-to-text module 328 may capture the sound, then may do a look-up in sound database 342 and search for the text corresponding to that sound.

Text-to-content module 329 may include computer-executable instructions executed by controller 310 for converting the text from the sound-to-text module 328 to content. Text-to-content module 329 may do a look-up in ASL content database 344 and search for the content corresponding to the text.

Content-to-ASL module 330 may include computer-executable instructions executed by controller 310 for converting the content of the text to ASL. Content-to-ASL module 330 functions to form content from the translated text, and after the content is formed, it converts that content into ASL. Content-to-ASL module 330 may, after converting the text into content, look up the content phrase in ASL content database 344 for the corresponding ASL equivalent.

ASL-to-animation module 332 may include computer-executable instructions executed by controller 310 for converting the ASL equivalent of the content of the text into ASL animation corresponding to that content. Text and animation display module 334 may include computer-executable instructions executed by controller 310 for displaying the text from the text-to-content module 329 and the one or more ASL animations from ASL-to-animation module 332.

In one exemplary embodiment, sound-to-text module 328, text-to-content module 329, content-to-ASL module 330, ASL-to-animation module 332, and text and animation display module 334 may all reside on controller 210 in user terminal 110, as opposed to residing on a separate server.

Figure 4:
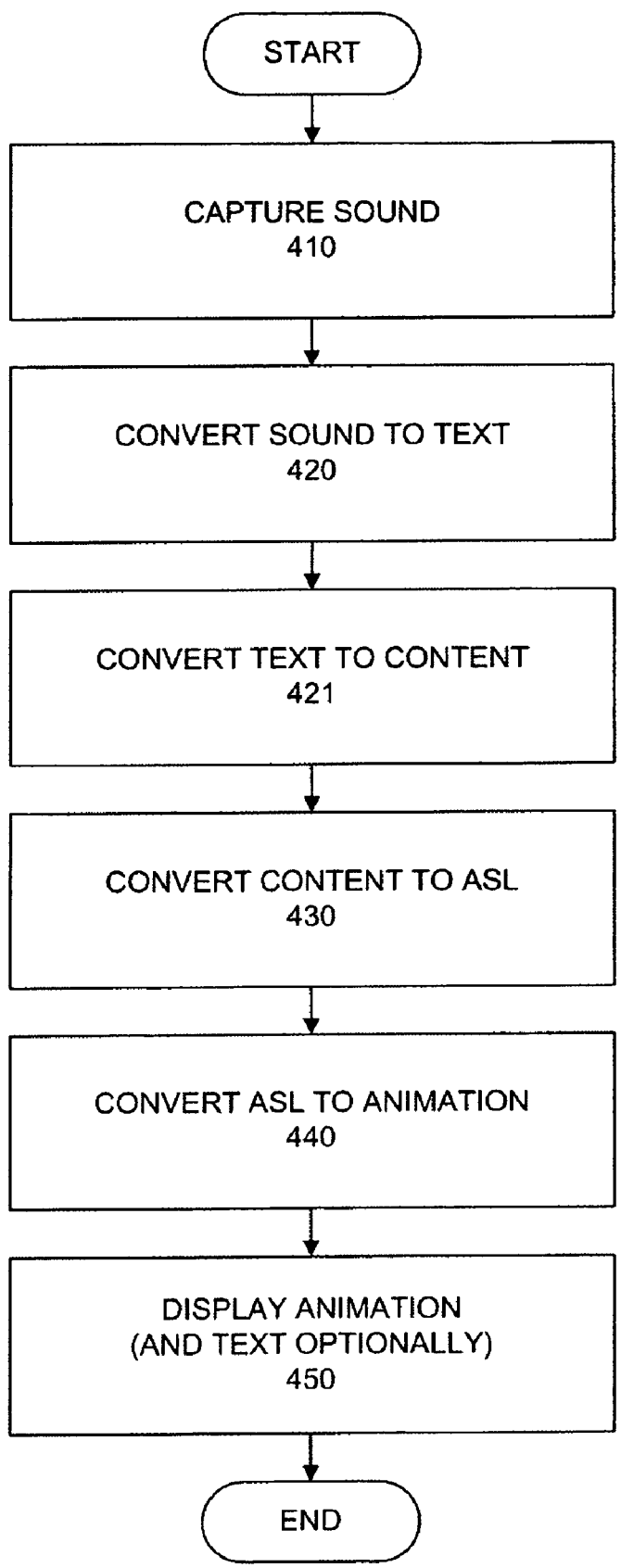
FIG. 4 illustrates a flowchart exemplifying one aspect related to the present invention.

FIG. 4 illustrates a flowchart exemplifying a translation process related to the present invention. User terminal 110 may first capture sound transmitted by third party 140 using sound module 248 (stage 410). Depending on the form third party 140 takes, different types of sound may be captured. For example, if third party 140 were a person, then the captured sound may be in the form of a conversation or single words. If third party 140 were a movie screen or television, then the sounds may represent words as well as other sounds, such as sounds that do not contain any words but are merely representative of recognizable sounds, such as, for example, a car horn, a doorbell, or a knock. A person skilled in the art will appreciate that other sounds are possible and the list is not limited to the examples above. Sound module 248 continuously captures the sound and transmits it to translation server 130 through network 120 in real time.

Translation server 130 may then convert the captured sound into text (stage 420). Translation server 130 may convert the sound using sound-to-text module 328. Sound-to-text module 328 may take each sound captured, look up the sound in sound database 342, and find the corresponding text to that sound. Sound-to-text module 328 may be implemented, for example, with any sound or speech recognition software, such as the Apple Speech Recognition provided by Apple Computers, Cupertino, Calif.

After translation server 130 converts the captured sound into text, translation server 130 may convert the content of the text into English content (stage 421) and from English content to ASL content (stage 430). Translation server 130 may convert the content into ASL using content-to-ASL module 330. Content-to-ASL module 330 may first group one or more of these text words and examine them for the meaning they convey—the overall content of the phrase. This content is then translated into another phrase of another language (i.e., ASL). This translated sentence would also be defined by a sequence of words that follow the ASL grammatical structure.

Translation server 130 may then convert the translated ASL sentence into animation representing the ASL sentence (stage 440). For each ASL phrase, ASL-to-animation module 332 may look up the phrase in ASL animation database 346 to find the corresponding animation. ASL-to-animation module 332 may convert each ASL content phrase into an animation that represents that phrase. ASL-to-animation module 332 may also convert each ASL content phrase into an animated character that emphasizes hand, arm, and face movements as the content is signed in ASL.

Content-to-ASL module 330 may also convert each English word translated by sound-to-text module 328 into single ASL animations representing the spelling of the English word. For example, if sound-to-text module 328 captured the word "dog," Content-to-ASL module 330 may look up each letter of the word in ASL animation database 346 for the corresponding ASL equivalent of each letter. Text representing the letters D-O-G will be shown in the display module 510, finger-spelled animation of the letters D-O-G will be shown in the display module 540 and a lip animation of the same English word would be shown via lip movement in the display module 520 (510, 540 and 520 are shown in FIG. 5)

Finally, translation server 130 may display the animation and, optionally, text, for the user (stage 450). Translation server 130 may display the text converted by sound-to-text module 328, as well as the animation equivalent of the content of the text converted by ASL-to-animation module 332. The animation may consist of a lip animation reading the words, a hand animation signing the spelling of the words, as well as an animated character signing the content in ASL language, as described above. Translation server 130 may display the text and animation as vector-based animation at user terminal 110 in real time.

Figure 5:
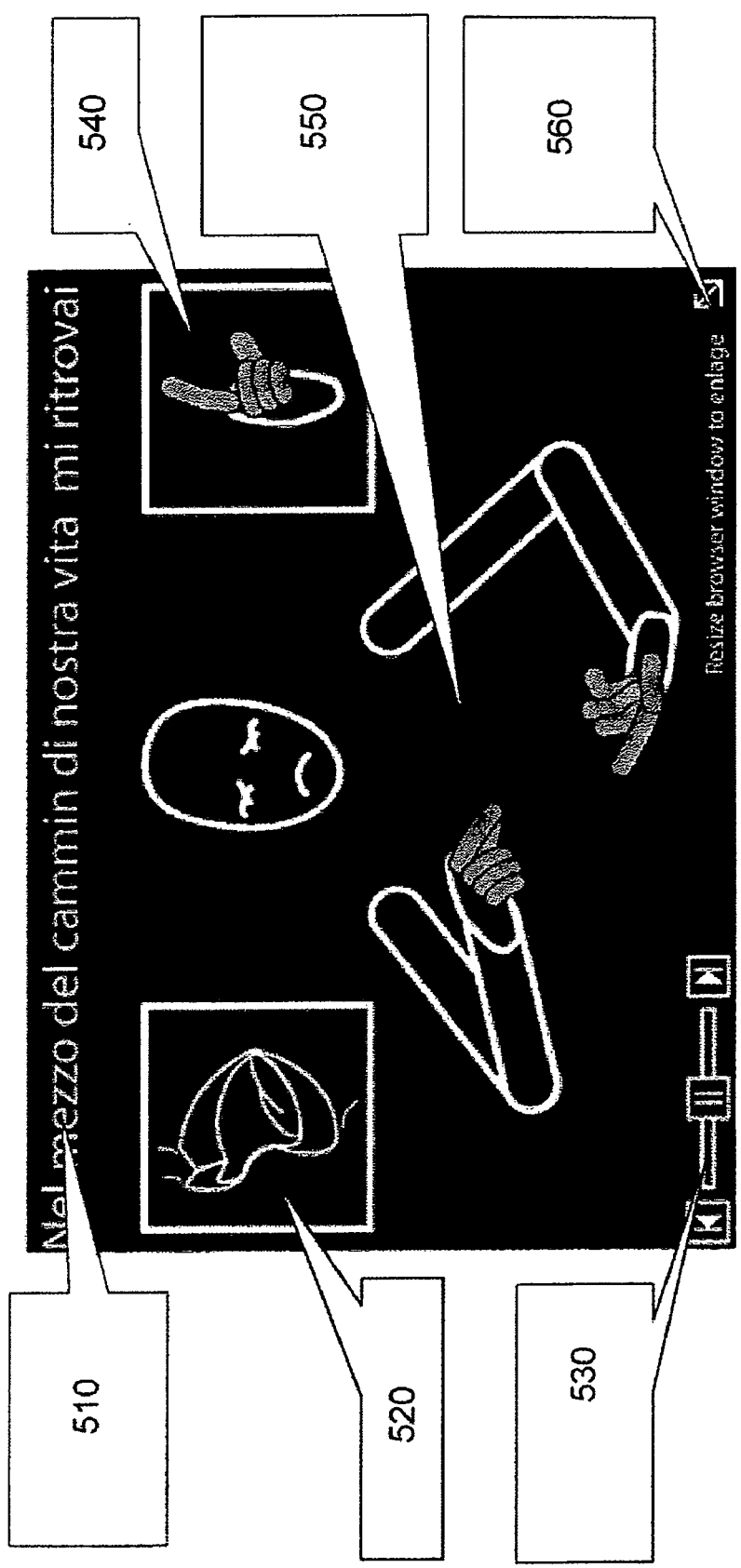
FIG. 5 illustrates an exemplary display consistent with an embodiment of the present invention.

FIG. 5 provides a diagram illustrating an exemplary graphical translator agent 500, consistent with an embodiment of the present invention. Text and animation display module 334 may generate graphical translator agent 500 accessible by user terminal 110 over network 120. For instance, graphical translator agent 500 may be an interactive user interface generated though XML and/or HTML, and displayed to user 105 by network browser module 244 as an interactive web page. Graphical translator agent 500 may alternatively be generated using Flash, provided by Macromedia Inc., San Francisco, Calif. Graphical translator agent 500 may also include text scroll 510, word lip read 520, video control 530, word spelling 540, animated character 550, and display customization 560.

Graphical translator agent 500 may also provide an interactive user interface enabling user 105 to view and manipulate text and visual content relating to the captured sound from third party 140. After sound-to-text module 328 translates the captured sound into text, the corresponding text is then displayed by the graphical translator agent 500 in the text scroll 510. Text scroll 510 automatically updates when a new sound or spoken word is translated into text.

As the text is displayed, the ASL equivalent of the spelling of each letter of the word represented by the text is also displayed in word spelling 540 after ASL-to-animation module 332 determines the ASL animation for each letter in the word. For example, if the word being displayed in text scroll 510 is "cat," ASL-to-animation module 332 may look up each letter in "cat" in ASL animation database 346 and display the corresponding ASL animation for each letter in word finger spelling 540 and lip reading 520.

Furthermore, as discussed previously, ASL-to-animation module 332 may convert each ASL content phrase into ASL signed by an animated character that emphasizes hand, arm, and facial movements of the content. Therefore, as the English text and the equivalent of the spelling of the word are being displayed, a lip-read graphic of the English word is also displayed in word lip read 520, as well as the animated character signing the ASL equivalent of the content phrase in animated character 550.

Graphical translator agent 500 may also include video control 530 to allow the user to pause or rewind a previously displayed text or animation. Graphical translator agent 500 may also include a display customization 560. The display customization 560 may allow the user to resize the various components of the graphical translator agent 500. Additional customizations and visual enhancements will allow readability for different kind of cognitive and visual impairments, by customizing the display size, animation speed, pause between sentences, color contrast, etc.

Although graphical translator agent 500, including displays 510-560, is shown in FIG. 5 as being implemented within a single user interface, one of ordinary skill in the art will readily recognize that in other implementations, each display may be a separate user interface or, alternatively, nested within a series of hierarchical user interfaces.

For purposes of explanation only, certain aspects of the preferred embodiments are described herein with reference to the components illustrated in FIGS. 1-5. The functionality of the illustrated components may overlap, however, and may be present in a fewer or greater number of elements and modules. Further, all or part of the functionality of the illustrated elements may coexist or be distributed among several geographically dispersed locations. Moreover, embodiments, features, aspects, and principles of the present invention may be implemented in various environments and are not limited to the illustrated environments.

Further, the sequences of events described in FIG. 4 are exemplary and not intended to be limiting. Thus, other method steps may be used, and even with the methods depicted in FIG. 4, the particular order of events may vary without departing from the scope of the present invention. Moreover, certain steps may not be present and additional steps may be implemented in FIG. 4. Also, the processes described herein are not inherently related to any particular apparatus and may be implemented by any suitable combination of components.

The foregoing description of preferred embodiments consistent with the present invention does not represent a comprehensive list of all possible embodiments or all variations of the embodiments described. The description of only some embodiments should not be construed as an intent to exclude other embodiments or variations thereof. Artisans will understand how to implement the invention in the appended claims in many other ways, using equivalents and alternatives that do not depart from the scope of the following claims. Moreover, unless indicated to the contrary in the preceding description, none of the components described in the implementations are essential to the invention.

What we claim is:

1. A method for providing a sign language graphic interpreter, comprising:

capturing sound from a party at a user terminal, wherein the sound comprises one or more words, and wherein the words convey information;

converting the one or more words into text representing each of the one or more words;

converting the text into one or more content phrases, wherein the content phrases represent the information and the content phrases are determined by looking up content associated with the text in a content database;

converting each of the one or more content phrases into a new language; wherein the new language is sign language; and displaying visual content at the user terminal representing the new language.

2. The method of claim 1, further comprising:

converting the new language into the visual content.

3. The method of claim 1, wherein the new language is American Sign Language.

4. The method of claim 1, wherein the party is at least one of a human being, a television, a theater, a radio, a computer, or a telephone.

5. The method of claim 1, wherein providing the visual content includes:

establishing a communication link between a server and the user terminal; and transmitting the visual content to the user terminal by streaming of a file.

6. The method of claim 5, wherein the visual content consists of at least one or more animations corresponding to the new language and visual text corresponding to the new language.

7. The method of claim 6, wherein the one or more animations include at least one of a lip-read graphic, a hand animation, and an animated character.

8. The method of claim 1, wherein the sound further comprises one or more unspoken noises.

9. A computer-readable medium storing instructions executable by a processor and configured to perform the method of claim 1 when executed by the processor.

10. A system for providing a sign language graphic interpreter, comprising:

a translation server connected to a network and accessible by at least one user terminal; and wherein the translation server is configured to:

receive over a network from a user terminal a request to convert sound into a visual content representing the sound, wherein the sound comprises one or more words and wherein the words convey information;

match the one or more words to text corresponding to the one or more words;

convert the text into one or more content phrases, wherein the content phrases represent of the information and the content phrases are determined by looking up content associated with the text in a content database;

convert each of the one or more content phrases into a new language; wherein the new language is sign language; and send visual content to the user terminal representing the new language.

11. The system of claim 10, wherein the translation server is further configured to convert the new language into the visual content.

12. The system of claim 10, wherein the new language is American Sign Language.

13. The system of claim 10, wherein the sound is received from a party that is at least one of a human being, a television, a theater, a radio, or a telephone.

14. The system of claim 10, wherein the translation server is further configured to:

establish a communication link between a server and the user terminal; and transmit the visual content to the user terminal by streaming of a file.

15. The system of claim 14, wherein the visual content consists of at least one or more animations corresponding to the new language and visual text corresponding to the new language.

16. The system of claim 15, wherein the one or more animations include at least one of a lip-read graphic, a hand animation, and an animated character.

17. The system of claim 15, wherein the sound further comprises one or more unspoken noises.

* * * * *